US012542233B2

(12) United States Patent
Kang et al.

(10) Patent No.: US 12,542,233 B2
(45) Date of Patent: Feb. 3, 2026

(54) COIL COMPONENT

(71) Applicant: SAMSUNG ELECTRO-MECHANICS CO., LTD., Suwon-si (KR)

(72) Inventors: Byung Soo Kang, Suwon-si (KR); Yong Hui Li, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 909 days.

(21) Appl. No.: 17/719,571

(22) Filed: Apr. 13, 2022

(65) Prior Publication Data

US 2022/0336146 A1 Oct. 20, 2022

(30) Foreign Application Priority Data

Apr. 16, 2021 (KR) ........................ 10-2021-0050039

(51) Int. Cl.

*H01F 5/00* (2006.01)
*H01F 27/28* (2006.01)
*H01F 27/29* (2006.01)
*H01F 27/32* (2006.01)
*H01F 41/12* (2006.01)

(52) U.S. Cl.

CPC ....... *H01F 27/323* (2013.01); *H01F 27/2804* (2013.01); *H01F 27/292* (2013.01); *H01F 41/122* (2013.01); *H01F 2027/2809* (2013.01)

(58) Field of Classification Search

CPC .................................................. H01F 27/2804
USPC .......................................................... 336/200
See application file for complete search history.

(56) References Cited

U.S. PATENT DOCUMENTS

2016/0268038 A1* 9/2016 Choi ..................... H01F 27/255
2017/0194089 A1* 7/2017 Jang ........................ H01F 27/29
2018/0047494 A1 2/2018 Yoon et al.
2019/0189338 A1* 6/2019 Kim ........................ H01F 27/29
2019/0333679 A1 10/2019 Lee et al.
2020/0035401 A1* 1/2020 Yoshinaka ............ H01F 27/324
(Continued)

FOREIGN PATENT DOCUMENTS

JP 2010-062502 A 3/2010
KR 10-2018-0017479 A 2/2018
KR 10-2019-0123849 A 11/2019
(Continued)

OTHER PUBLICATIONS

Office Action issued in corresponding Korean Patent Application No. 10-2021-0050039 on Jul. 21, 2025, with English translation.

*Primary Examiner* — Ronald Hinson
(74) *Attorney, Agent, or Firm* — MORGAN, LEWIS & BOCKIUS LLP

(57) ABSTRACT

A coil component includes: a body having one surface and the other surface opposing each other and a plurality of walls connecting the one surface and the other surface to each other; a coil portion disposed within the body; first and second external electrodes disposed on the one surface of the body while being spaced apart from each other and connected to the coil portion; a first insulating layer disposed on the other surface of the body and extending to at least a portion of each of the plurality of walls of the body; and a second insulating layer disposed on the one surface of the body.

17 Claims, 20 Drawing Sheets

(56) References Cited

U.S. PATENT DOCUMENTS

| | | | |
|---|---|---|---|
| 2020/0279687 | A1 | 9/2020 | Koo et al. |
| 2021/0057146 | A1 | 2/2021 | Yang et al. |

FOREIGN PATENT DOCUMENTS

| | | | |
|---|---|---|---|
| KR | 10-2120198 | B1 | 6/2020 |
| KR | 10-2176276 | B1 | 11/2020 |

* cited by examiner

COIL COMPONENT

CROSS-REFERENCE TO RELATED APPLICATION(S)

This application claims benefit of priority to Korean Patent Application No. 10-2021-0050039 filed on Apr. 16, 2021 in the Korean Intellectual Property Office, the disclosure of which is incorporated herein by reference in its entirety.

BACKGROUND

1. Field

The present disclosure relates to a coil component.

2. Description of Related Art

An inductor, a coil component, is a representative passive electronic component used in an electronic device, together with a resistor and a capacitor.

As the electronic devices gradually increase in performance and become smaller, the number of electronic components used in electronic devices has increased, and the electronic components have decreased in size.

Recently, with the development of technologies such as smartphones, wearable devices, and autonomous vehicles, the use of passive components has rapidly increased. In particular, in the case of a power inductor used as a main component in various filters as well as in a power-related integrated circuit (IC) such as a power management integrated circuit (PMIC), demand for power inductors ranging from large chips to small chips has rapidly increased. Further, in addition to the existing standard-sized chip, a demand for a square-shaped chip has also increased.

Another important technology trend is circuit integration, and in the case of passive components, the development of a lower surface electrode implementation technique making circuit integration possible has been required. In the case of the square-shaped chip, since vision sorting equipment needs to be used for chip arrangement, productivity decreases and costs rise. Therefore, a technology for implementing an L-shaped electrode and a lower surface electrode structure in a chip having a square structure is required.

SUMMARY

An aspect of the present disclosure may provide a coil component capable of being lightweight, thin, and compact.

Another aspect of the present disclosure may provide a coil component capable of improving productivity and significantly reducing man-hours by simplifying a manufacturing process.

Another aspect of the present disclosure may provide a coil component in which a volume of a magnetic body is increased to increase inductance thereof.

Another aspect of the present disclosure may provide a coil component capable of reducing an effective mounting area.

According to an aspect of the present disclosure, a coil component may include: a body having one surface and the other surface opposing each other and a plurality of walls connecting the one surface and the other surface to each other; a coil portion disposed within the body; first and second external electrodes disposed on the one surface of the body while being spaced apart from each other and connected to the coil portion; a first insulating layer disposed on the other surface of the body and extending to at least a portion of each of the plurality of walls of the body; and a second insulating layer disposed on the one surface of the body.

According to another aspect of the present disclosure, a coil component may include: a body having one surface and the other surface opposing each other and a plurality of walls connecting the one surface and the other surface to each other; a coil portion disposed within the body; first and second external electrodes disposed on the one surface of the body spaced apart from each other and connected to the coil portion; first and second insulating layers disposed on the other surface of the body and the one surface of the body, respectively; and third and fourth insulating layers respectively connected to the one surface of the body, disposed on opposite end surfaces of the body opposing each other in a first direction, respectively, and each extending to the one surface of the body, wherein the second insulating layer is spaced apart from each of a plurality of edges of the one surface of the body, and a shortest distance between each of the plurality of edges of the one surface of the body and the first and second external electrodes is longest at a vertex region of the one surface of the body.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
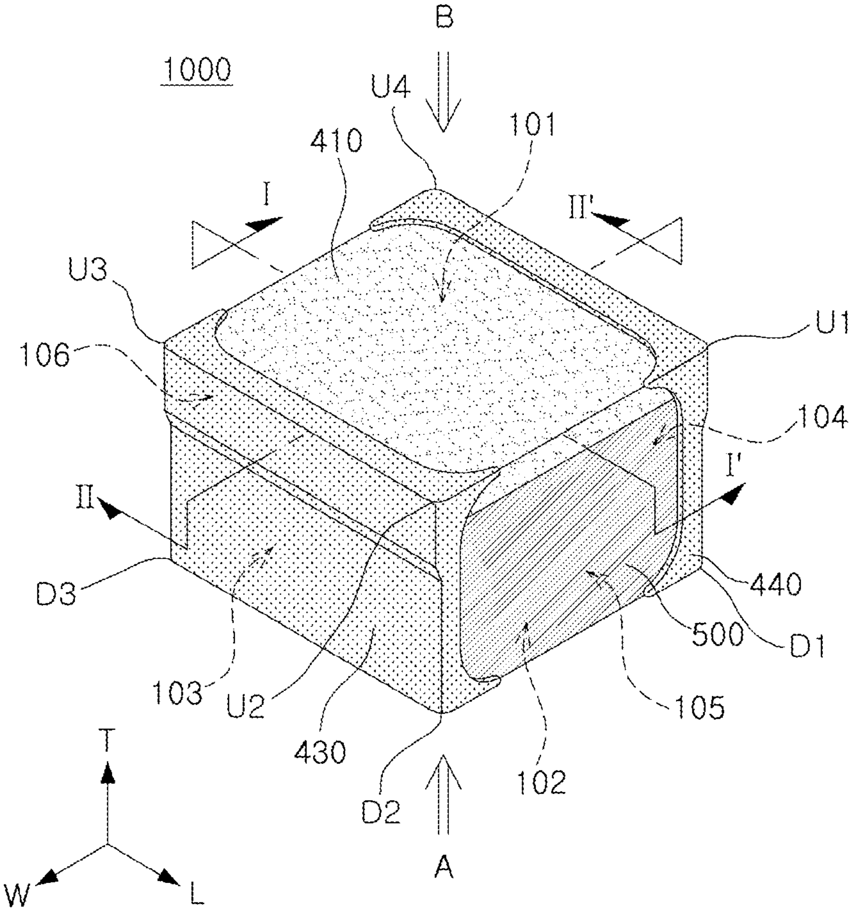
FIG. 1 is a perspective view schematically illustrating a coil component according to an exemplary embodiment.

Hereinafter, exemplary embodiments in the present disclosure will now be described in detail with reference to the accompanying drawings.

In the drawings, an L direction refers to a first direction or a length direction, a W direction refers to a second direction or a width direction, and a T direction refers to a third direction or a thickness direction.

Various kinds of electronic components may be used in an electronic device, and various kinds of coil components may be appropriately used between these electronic components for purposes such as noise removal.

That is, the coil components used in the electronic device may be a power inductor, a high frequency (HF) inductor, a general bead, a high frequency bead (GHz bead), a common mode filter, and the like.

FIG. 1 is a perspective view schematically illustrating a coil component according to an exemplary embodiment.

Figure 2:
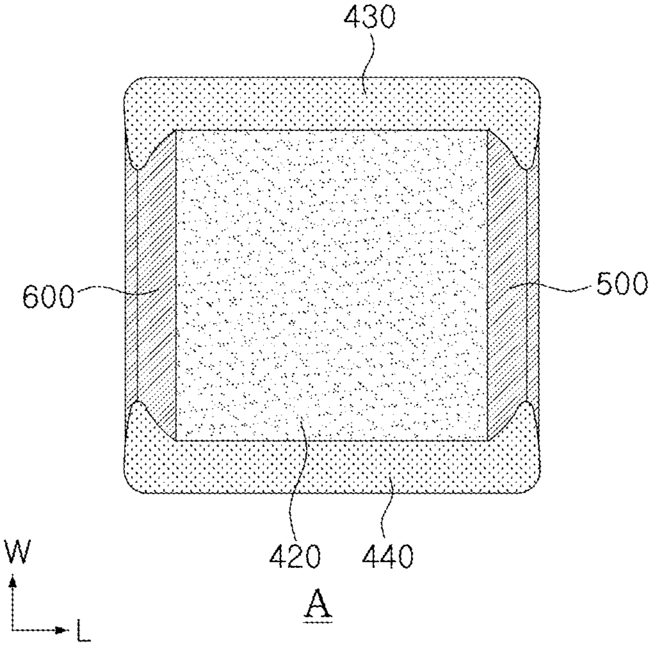
FIG. 2 is a bottom view illustrating the coil component according to an exemplary embodiment as viewed from below (a direction A in FIG. 1)

FIG. 2 is a bottom view illustrating the coil component according to an exemplary embodiment as viewed from below (a direction A in FIG. 1).

Figure 3:
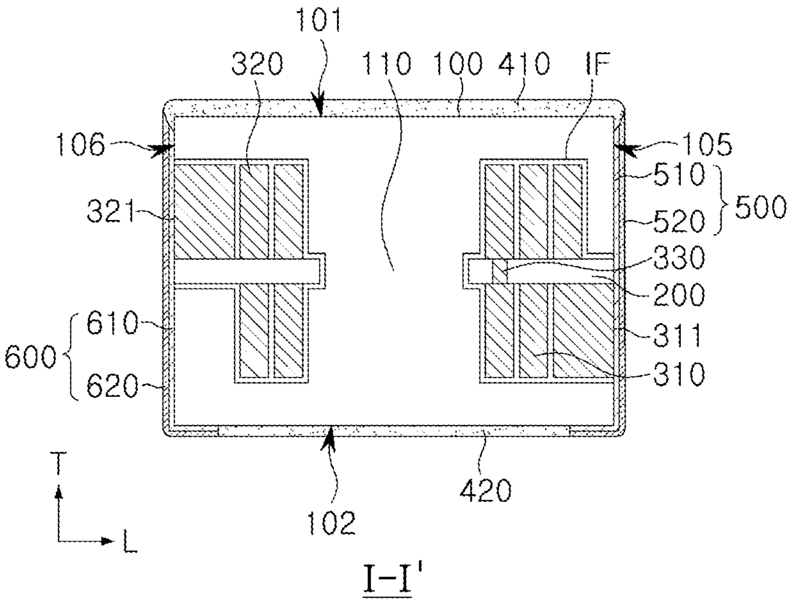
FIG. 3 is a cross-sectional view taken along line I-I' of FIG. 1.

FIG. 3 is a cross-sectional view taken along line I-I' of FIG. 1.

Figure 4:
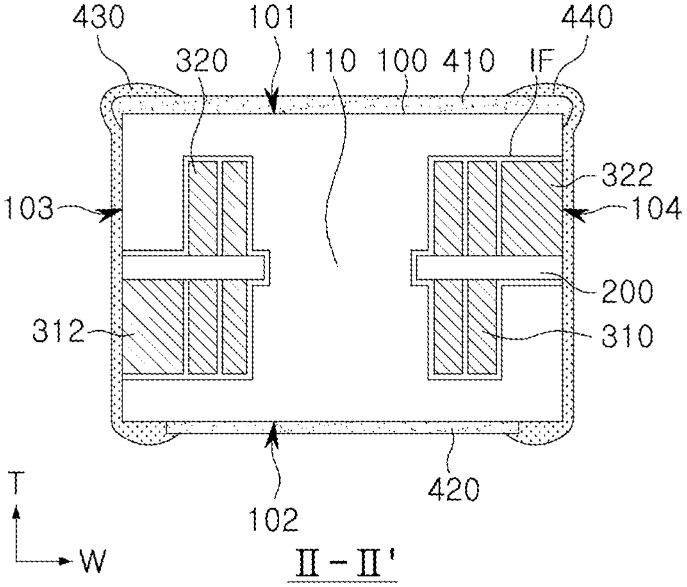
FIG. 4 is a cross-sectional view taken along line II-II' of FIG. 1.

FIG. 4 is a cross-sectional view taken along line II-II' of FIG. 1.

Figure 5:
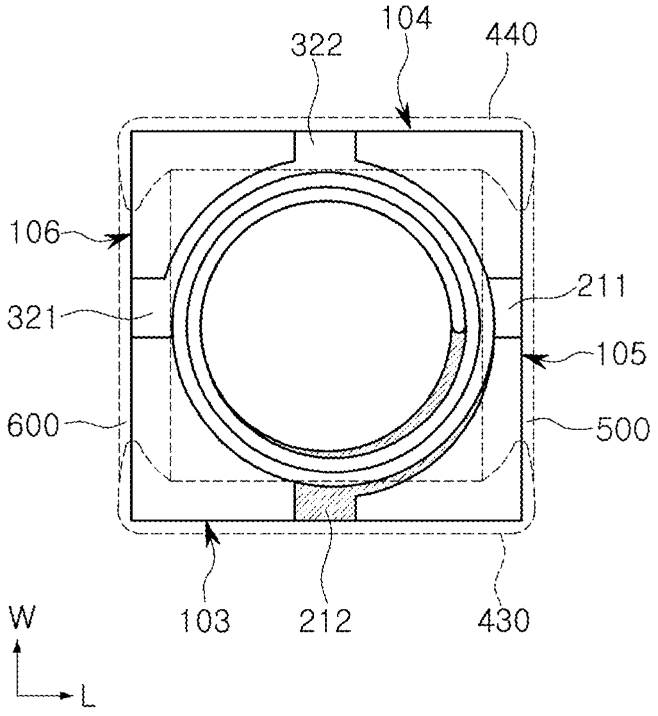
FIG. 5 is a transparent view illustrating the coil component of FIG. 1 according to an exemplary embodiment as viewed from above (a direction B in FIG. 1)

FIG. 5 is a transparent view of the coil component of FIG. 1 according to an exemplary embodiment as viewed from above (a direction B in FIG. 1).

Referring to FIGS. 1 through 4, a coil component 1000 according to a first exemplary embodiment in the present disclosure may include a body 100, a substrate 200, a coil portion 300 including the first and second coil patterns 310 and 320, insulating layers 410, 420, 430, 440, 450, and 460, and first and second external electrodes 500 and 600, and may further include an insulating film IF.

The body 100 may form an appearance of the coil component 1000 according to the first exemplary embodiment, and the coil portion 300 and the substrate 200 are disposed within the body 100.

The body 100 may generally have a hexahedral shape.

The body 100 may have a first surface 101 and a second surface 102 opposing each other in the thickness direction T, a third surface 103 and a fourth surface 104 opposing each other in the width direction W, and a fifth surface 105 and a sixth surface 106 opposing each other in the length direction L as illustrated in FIGS. 1, 3, and 4. The third to sixth surfaces 103 to 106 of the body 100 may correspond to a plurality of walls of the body 100 connecting the first and second surfaces 101 and 102 of the body 100 to each other. Hereinafter, opposite end surfaces of the body 100 may refer to the third and fourth surfaces 103 and 104 of the body 100, opposite side surfaces of the body 100 may refer to the fifth and sixth surfaces 105 and 106 of the body 100, and one surface and the other surface of the body 100 may refer to the second and first surfaces 102 and 101 of the body 100, respectively.

As an example, the body 100 may be formed so that the coil component 1000 according to the first exemplary embodiment, in which the external electrodes 500 and 600 and the insulating layers 410, 420, 430, 440, 450, and 460 to be described later are formed, may have a length of 4.0 mm and a width of 4.0 mm, but the size of the coil component 1000 is not limited thereto.

Here, the length of the coil component 1000 according to the first exemplary embodiment may refer to the largest value among lengths of a plurality of line segments connecting two boundary lines facing each other in the length direction L among outermost boundary lines of the coil component 1000 shown in an optical microscopic image obtained by imaging the first surface 101 of the body 100 of the coil component 1000 from above the first surface 101 of the body 100, the plurality of line segments being parallel to the length direction L. Alternatively, the length of the coil component 1000 may refer to the smallest value among the lengths of the plurality of line segments connecting two boundary lines facing each other in the length direction L among the outermost boundary lines of the coil component 1000 shown in the optical microscopic image, the plurality of line segments being parallel to the length direction L. Alternatively, the length of the coil component 1000 may refer to an arithmetic mean value of lengths of three or more of the plurality of line segments connecting two boundary lines facing each other in the length direction L among the outermost boundary lines of the coil component 1000 shown in the optical microscopic image, the plurality of line segments being parallel to the length direction L.

Here, the width of the coil component 1000 may refer to the largest value among lengths of a plurality of line segments connecting two boundary lines facing each other in the width direction W among the outermost boundary lines of the coil component 1000 shown in the optical microscopic image obtained by imaging the first surface 101 of the body 100 of the coil component 1000 from above the first surface 101 of the body 100, the plurality of line segments being parallel to the width direction W. Alternatively, the width of the coil component 1000 may refer to the smallest value among the lengths of the plurality of line segments connecting two boundary lines facing each other in the width direction W among the outermost boundary lines of the coil component 1000 shown in the optical microscopic image, the plurality of line segments being parallel to the width direction W. Alternatively, the width of the coil component 1000 may refer to an arithmetic mean value of lengths of three or more of the plurality of line segments connecting two boundary lines facing each other in the width direction W among the outermost boundary lines of the coil component 1000 shown in the optical microscopic image, the plurality of line segments being parallel to the width direction W.

Here, the thickness of the coil component 1000 may refer to the largest value among lengths of a plurality of line segments connecting two boundary lines facing each other in the thickness direction T among outermost boundary lines of the coil component 1000 shown in an optical microscopic image obtained by imaging the third surface 103 of the body 100 of the coil component 1000 from above the third surface 103 of the body 100, the plurality of line segments being parallel to the thickness direction T. Alternatively, the thickness of the coil component 1000 may refer to the smallest value among the lengths of the plurality of line segments connecting two boundary lines facing each other in the thickness direction T among the outermost boundary lines of the coil component 1000 shown in the optical microscopic image, the plurality of line segments being parallel to the thickness direction T. Alternatively, the thickness of the coil component 1000 may refer to an arithmetic mean value of lengths of three or more of the plurality of line segments connecting two boundary lines facing each other in the thickness direction T among the outermost boundary lines of the coil component 1000 shown in the optical microscopic image, the plurality of line segments being parallel to the thickness direction T.

Alternatively, each of the length, the width, and the thickness of the coil component 1000 may be measured by a micrometer measurement method. According to the micrometer measurement method, measurement may be performed by zeroing a micrometer subjected to gage repeatability and reproducibility (R&R), inserting the coil component 1000 according to the first exemplary embodiment between tips of the micrometer, and turning a measurement lever of the micrometer. Meanwhile, when measuring the length of the coil component 1000 by the micrometer measurement method, the length of the coil component 1000 may refer to a value obtained by performing the measurement once, or an arithmetic mean of values obtained by performing the measurement multiple times. The same may apply to the width and the thickness of the coil component 1000.

The body 100 may contain a magnetic material and a resin. Specifically, the body 100 may be formed by stacking one or more magnetic composite sheets in which the magnetic material is dispersed in the resin. However, the body 100 may have a structure other than the structure in which the magnetic material is dispersed in the resin. For example, the body 100 may be formed of a magnetic material such as a ferrite.

A cross section of the body 100 according to the present disclosure may have a square shape when viewed in the thickness direction T. That is, each of the first surface 101 and the second surface 102 of the body 100 may have a square shape, and the width W of the body 100 and the length L of the body 100 may have similar values. Therefore, it may be difficult to specify the length direction and the width direction of the body 100 only with an appearance of the body 100.

For example, the body 100 may have a length of 4.0 mm, a width of 4.0±0.2 mm, and a thickness of 1.0 mm. That is, referring to FIGS. 2 and 5, a distance between the third surface 103 and the fourth surface 104 of the body 100 may be 4.0 mm, and a distance between the fifth surface 105 and the sixth surface 106 of the body 100 may be 4.0±0.2 mm. Accordingly, an absolute value of a difference between the length (A) and the width (B) of the body 100 may be 0.2 mm or less. However, the scope of the present disclosure is not limited to the above-described size of the body 100. That is, the scope of the present disclosure may include a case in which it is difficult to specify the length direction and the width direction of the body 100 only with the appearance of the body 100 because the length and the width of the body 100 have almost the same values, even in a case in which the size of the body 100 is different from that described above. Meanwhile, since the above-described size of the body 100 is a numerical value that does not reflect process errors and the like, the actual size of the body 100 may have a different value from the above-described value due to process errors and the like.

As such, in a case in which the cross section of the body in the thickness direction T has a square shape or a shape similar to the square shape, and thus it is difficult to distinguish between the length direction and the width direction of the body 100, the width direction and the length direction of the body 100 may need not be distinguished from each other during a manufacturing process, together with a lead-out structure of the coil portion 300 to be described later.

The magnetic material may include a ferrite or metal magnetic powder.

The ferrite may be, for example, at least one of a spinel type ferrite such as a Mg—Zn-based ferrite, a Mn—Zn-based ferrite, a Mn—Mg-based ferrite, a Cu—Zn-based ferrite, a Mg—Mn—Sr-based ferrite, or a Ni—Zn-based ferrite, a hexagonal ferrite such as a Ba—Zn-based ferrite, a Ba—Mg-based ferrite, a Ba—Ni-based ferrite, a Ba—Co-based ferrite, or a Ba—Ni—Co-based ferrite, a garnet type ferrite such as an Y-based ferrite, or a Li-based ferrite.

The metal magnetic powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Si—Cu—Nb-based alloy powder, Fe—Ni—Cr-based alloy powder, or Fe—Cr—Al-based alloy powder.

The metal magnetic powder may be amorphous or crystalline. For example, the metal magnetic powder may be Fe—Si—B—Cr based amorphous alloy powder, but is not necessarily limited thereto.

The metal magnetic powder may have an average diameter of about 0.1 μm to 30 μm, but is not limited thereto.

The body 100 may include two or more kinds of magnetic materials dispersed in a resin. Here, different kinds of magnetic materials mean that magnetic materials dispersed in a resin are distinguished from each other by any one of an average diameter, a composition, crystallinity, and/or a shape of the magnetic materials.

The resin may include epoxy, polyimide, liquid crystal polymer (LCP), or the like, or mixtures thereof, but is not limited thereto.

The body 100 may include a core 110 penetrating through a central portion of each of the substrate 200 and the coil portion 300 to be described later. The core 110 may be formed by filling the central portion of each of the coil portion 300 and the substrate 200 with the magnetic composite sheet, but is not limited thereto.

The substrate 200 may be embedded in the body 100. The substrate 200 may be a component supporting the coil portion 300 to be described later. The substrate 200 may support first and second coil patterns 310 and 320 to be described later, and may have a plurality of distal end portions, and the plurality of distal end portions may be exposed to the outside of the body 100.

As an example, the plurality of distal end portions of the substrate 200 may include first and second main distal end portions 211 and 221, and first and second auxiliary distal end portions 212 and 222. The first and second main distal end portions 211 and 221 may support first and second main lead-out portions 311 and 321 to be described later, respectively. The first and second auxiliary distal end portions 212 and 222 may support first and second auxiliary lead-out portions 312 and 322 to be described later, respectively. Further, the first main distal end portion 211 may be exposed to the fifth surface 105 of the body 100 together with the first main lead-out portion 311, the second main distal end portion 221 may be exposed to the sixth surface 106 of the body 100 together with the second main lead-out portion 321, the first auxiliary distal end portion 212 may be exposed to the third surface 103 of the body 100 together with the first auxiliary lead-out portion 312, and the second auxiliary distal end portion 222 may be exposed to the fourth surface 104 of the body 100 together with the second auxiliary lead-out portion 322.

The substrate 200 may be formed of an insulating material including a thermosetting resin such as an epoxy resin, a thermoplastic resin such as a polyimide resin, or a photosensitive insulating resin or be formed of an insulating material having a reinforcement material such as a glass fiber or an inorganic filler impregnated in such an insulating resin. For example, the substrate 200 may be formed of an insulating material such as prepreg, an Ajinomoto Build-up Film (ABF), FR-4, a Bismaleimide Triazine (BT) resin, a photoimagable dielectric (PID), or the like, but is not limited thereto.

As the inorganic filler, at least one selected from the group consisting of silica ($SiO_2$), alumina ($Al_2O_3$), silicon carbide (SiC), barium sulfate ($BaSO_4$), talc, clay, mica powders, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

In a case in which the substrate 200 is formed of the insulating material including the reinforcement material, the substrate 200 may provide more excellent rigidity. In a case in which the substrate 200 is formed of an insulating material that does not include a glass fiber, the substrate 200 may be advantageous in decreasing the thickness of the coil component 1000 according to the first exemplary embodiment. In addition, a volume occupied by the coil portion 300 and/or the magnetic material with respect to the body 100 having the same size may be increased, and thus a characteristic of the component may be improved. In a case in which the substrate 200 is formed of the insulating material including the photosensitive insulating resin, the number of processes for forming the coil portion 300 may be decreased, which is advantageous in decreasing a production cost, and a fine via may be formed.

The coil portion 300 may be disposed within the body 100, and may implement the characteristic of the coil component. For example, in a case in which the coil component 1000 according to the present exemplary embodiment is used as a power inductor, the coil portion 300 may serve to store an electric field as a magnetic field to maintain an output voltage, thereby stabilizing power of an electronic device.

The coil portion 300 may include the first and second coil patterns 310 and 320, respectively, and vias 330. Specifically, the first coil pattern 310 may be disposed on a lower surface of the substrate 200 that faces the second surface 102 of the body 100, and the second coil pattern 320 may be disposed on an upper surface of the substrate 200 opposing the lower surface of the substrate 200, in the directions in FIGS. 3 and 4. The via 330 may penetrate through the substrate 200 and be connected to an inner end portion of each of the first coil pattern 310 and the second coil pattern 320. By doing so, the coil portion 300 may function as a single coil as a whole. Each of the first and second coil patterns 310 and 320 may have an outer end portion exposed to the outside of the body 100. The outer end portion of the first coil pattern 310 may include the first main lead-out portion 311 exposed to the fifth surface 105 of the body and the first auxiliary lead-out portion 312 exposed to the third surface 103 of the body. The outer end portion of the second coil pattern 320 may include the second main lead-out portion 321 exposed to the sixth surface 106 of the body and the second auxiliary lead-out portion 322 exposed to the fourth surface 104 of the body.

As a result, in the coil component 1000 according to the first exemplary embodiment, the first and second external electrodes 500 and 600 may be more easily connected to the coil portion 300 even without a process of identifying and specifying surfaces on which the first and second external electrodes 500 and 600 as described later are to be formed among the surfaces of the body 100. That is, even in a case in which it is difficult to specify the width direction and the length direction because the width and the length of the body 100 are similar to each other, the first and second external electrodes 500 and 600 may be connected to the coil portion 300 as long as the first and second external electrodes 500 and 600 are formed on two opposing surfaces of the third to sixth surfaces 103, 104, 105, and 106 of the body 100. Specifically, as illustrated in FIG. 5, the first and second external electrodes 500 and 600 may be formed on the fifth and sixth surfaces 105 and 106 of the body 100 opposing each other in the length direction L of the body 100, respectively. However, the surfaces on which the first and second external electrodes 500 and 600 are formed are not limited thereto, and the first and second external electrodes 500 and 600 may be formed on the third and fourth surfaces 103 and 104 of the body 100 opposing each other in the width direction W of the body 100, respectively, to easily connect the first and second external electrodes 500 and 600 and the coil portion 300. For this reason, the coil component 1000 according to the first exemplary embodiment does not require a separate identification mark used when forming the first and second external electrodes 500 and 600.

The first main lead-out portion 311 and the first auxiliary lead-out portion 312 may be formed together with the first coil pattern 310 in the same process, and thus, a boundary may not be formed therebetween. That is, the first main lead-out portion 311, the first auxiliary lead-out portion 312, and the first coil pattern 310 may be integrally formed. The second main lead-out portion 321 and the second auxiliary lead-out portion 322 may be formed together with the second coil pattern 320 in the same process, and thus, a boundary may not be formed therebetween. That is, the second main lead-out portion 321, the second auxiliary lead-out portion 322, and the second coil pattern 320 may be integrally formed.

An area of the first main lead-out portion 311 exposed to the fifth surface 105 of the body 100, an area of the first auxiliary lead-out portion 312 exposed to the third surface 103 of the body 100, an area of the second main lead-out portion 321 exposed to the sixth surface 106 of the body 100, and an area of the second auxiliary lead-out portion 322 exposed to the fourth surface 104 of the body 100 may be substantially the same. In this case, regardless of which surfaces the first and second external electrodes 500 and 600 are formed on among the third to sixth surfaces 103, 104, 105, and 106 of the body 100, reliability of connection between the coil portion 300 and the first and second external electrodes 500 and 600 may be constantly maintained.

The outer end portions of the first and second coil patterns 310 and 320 exposed to the fifth and sixth surfaces 105 and 106 of the body 100 may be in contact with first electrode layers 510 and 610 of the external electrodes 500 and 600 to be described later, respectively. Specifically, the first main lead-out portion 311 exposed to the fifth surface 105 of the body 100 may be in contact with the first external electrode 500 to be described later, and the second main lead-out portion 321 exposed to the sixth surface of the body 100 may be in contact with the second external electrode 600.

On the other hand, the first auxiliary lead-out portion 312 exposed to the third surface 103 of the body 100 may be in contact with the third insulating layer 430 to be described later, and the second auxiliary lead-out portion 322 exposed to the fourth surface 104 of the body 100 may be in contact with the fourth insulating layer 440 to be described later.

Each of the first coil pattern 310 and the second coil pattern 320 may have a planar spiral shape forming at least one turn around the core 110. As an example, the first coil pattern 310 may form at least one turn around the core 110 on the lower surface of the substrate 200.

At least one of the coil pattern 310, the coil pattern 320, or the via 330 may include at least one conductive layer. As an example, in a case in which the second coil pattern 320 and the via 330 are formed on the upper surface of the substrate 200 by plating, each of the second coil pattern 320 and the via 330 may include a seed layer and an electroplating layer. Here, the electroplating layer may have a single-layer structure or have a multilayer structure. The electroplating layer having the multilayer structure may be formed in a conformal film structure in which one electroplating layer is formed along a surface of another electroplating layer, or may be formed in a shape in which one electroplating layer is stacked on only one surface of another electroplating layer. The seed layer may be formed by an electroless plating method or a vapor deposition method such as sputtering. The seed layers of the second coil pattern 320 and the via 330 may be formed integrally with each other, such that a boundary is not formed therebetween. However, the seed layers are not limited thereto. The electroplating layers of the second coil pattern 320 and the via 330 may be formed integrally with each other, such that a boundary is not formed therebetween. However, the electroplating layers are not limited thereto.

As another example, in a case in which the first coil pattern 310 disposed on the lower surface of the substrate 200 and the second coil pattern 320 disposed on the upper surface of the substrate 200 are formed separately, and then collectively stacked on the substrate 200 to form the coil portion 300, the via 330 may include a high-melting-point metal layer and a low-melting-point metal layer having a melting point lower than that of the high-melting-point metal layer. Here, the low-melting-point metal layer may be formed of a solder including lead (Pb) and/or tin (Sn). In some embodiments, at least a portion of the low-melting-point metal layer may be melted due to pressure and temperature at the time of the collective stacking, such that an intermetallic compound (IMC) layer may be formed on a boundary between the low-melting-point metal layer and the second coil pattern 320.

In some embodiments, the coil patterns 310 and 320 may protrude from the lower surface and the upper surface of the substrate 200, respectively, as illustrated in FIGS. 3 and 4. As another example, the first coil pattern 310 may protrude from the lower surface of the substrate 200, and the second coil pattern 320 may be embedded in the upper surface of the substrate 200 in such a manner that an upper surface of the second coil pattern 320 is exposed to the upper surface of the substrate 200. In this case, a recess portion may be formed in the upper surface of the second coil pattern 320, such that the upper surface of the substrate 200 and the upper surface of the second coil pattern 320 are not positioned on the same plane.

The coil patterns 310 and 320 and the vias 330 may each be formed of a conductive material such as copper (Cu), aluminum (Al), silver (Ag), tin (Sn), gold (Au), nickel (Ni), lead (Pb), titanium (Ti), chromium (Cr), or alloys thereof, but are not limited thereto.

The first and second insulating layers 410 and 420 may be disposed on the first and second surfaces 101 and 102 of the body 100, respectively.

According to the present exemplary embodiment, the first insulating layer 410 may be disposed on the first surface 101 corresponding to the other surface of the body 100, and extend to at least portions of the plurality of walls 103, 104, 105, and 106 of the body 100 that each connect the first and second surfaces 101 and 102. This is because the first insulating layer 410 is formed by a pad printing method, and the pad printing method will be described later. As such, as the first insulating layer 410 extends to at least portions of the plurality of walls 103, 104, 105, and 106 of the body 100, as illustrated in FIGS. 1, 3, and 4, the first insulating layer 410 may cover upper vertex regions U1, U2, U3, and U4, which are respective vertex regions of the first surface 101. Here, the upper vertex regions U1, U2, U3, and U4 formed between the first surface 101 and the third to sixth surfaces 103, 104, 105, and 106 may refer to four vertex regions disposed on edges of the first surface 101 among eight vertex regions of the body 100 having a hexahedral shape. As the first insulating layer 410 covers all the upper vertex regions U1, U2, U3, and U4, a more reliable insulating property may be maintained. Further, in the present specification, the vertex region may refer to a boundary region formed by three connected surfaces of the body 100, and may not coincide with a vertex in a mathematical sense.

In addition, as illustrated in FIG. 1, the first insulating layer 410 may cover edges between the first surface 101 of the body and the third to sixth surfaces 103, 104, 105, and 106 of the body.

FIG. 2 is a view of the second surface 102 of the coil component 1000 as viewed from the outside. The second insulating layer 420 may be disposed on the second surface 102 corresponding to one surface of the body 100 opposing the other surface thereof, and the second insulating layer 420 may be spaced apart from each edge of the second surface 102 by a predetermined distance. Referring to FIG. 2, for example, the distance by which the second insulating layer 420 is spaced apart from each of the plurality of edges of the second surface 102 may correspond to ⅛ of a width or a length of the second insulating layer 420. That is, the width and the length of the second insulating layer 420 may correspond to 0.8 times a width and a length of the second surface 102 of the body 100, respectively, but this is only an example, and the width and the length of the second insulating layer 420 are not limited thereto. In some cases, the width and the length of the second insulating layer 420 may correspond to 0.8 times or more the width and the length of the second surface 102 of the body 100, respectively. In addition, the second insulating layer 420 may have a square shape on the second surface 102 of the body 100. Therefore, a length of each of a plurality of edges of the second insulating layer 420 may correspond to 0.8 times the length of each of the plurality of edges of the second surface 102 of the body 100. However, the scope of the present disclosure is not limited to the above-described shape of the second insulating layer 420. That is, the scope of the present disclosure may include a case in which it is difficult to specify the length direction and the width direction of the second insulating layer 420 only with the appearance of the second insulating layer 420 because the length and the width of the second insulating layer 420 have almost the same values, even in a case in which the shape of the second insulating layer 420 is different from that described above.

In a region of the second surface 102 of the body 100 except for a region covered by the second, third, and fourth insulating layers 102, 103, and 104, the first and second external electrodes 500 and 600 to be described later may be disposed.

The third and fourth insulating layers 430 and 440 may each be connected to the second surface 102 corresponding to one surface of the body 100, may be disposed on the opposite end surfaces 103 and 104 of the body 100 opposing each other, respectively, and may each extend to at least a portion of each of the first surface 101, the second surface 102, the fifth surface 105, and the sixth surface 106 connecting the opposite end surfaces 103 and 104 of the body 100. Here, the third and fourth insulating layers 430 and 440 extending to the first surface 101 of the body 100 may cover at least a portion of the first insulating layer 410 to form an overlapping region. Further, the third and fourth insulating layers 430 and 440 extending to the second surface 102 of the body 100 may cover at least a portion of the second insulating layer 420 to form an overlapping region.

As the third and fourth insulating layers 430 and 440 are disposed, each of the upper vertex regions U1, U2, U3, and U4 already covered by the first insulating layer 410 may be double covered by at least one of the third insulating layer 430 or the fourth insulating layer 440. As a result, a more reliable insulating property may be ensured. Meanwhile, as the third and fourth insulating layers 430 and 440 extend to the second surface 102 of the body 100, each of lower vertex regions D1, D2, D3, and D4 of the second surface 102 may be covered by at least one of the third insulating layer 430 or the fourth insulating layer 440. In particular, in a case in which the external electrodes 500 and 600 to be described later are disposed on the second surface 102 of the body 100, each of the lower vertex regions D1, D2, D3, and D4 of the second surface 102 may be covered by at least one of the third insulating layer 430 or the fourth insulating layer 440, such that a plating failure of the external electrodes 500 and 600 may be prevented, and at the same time, a short circuit with other external electrodes near the lower vertex regions D1, D2, D3, and D4 may be prevented.

In general, there is a high probability that cracks exist in the edges and vertices, which are boundaries between the surfaces of the body, and there is a high probability that the conductive metal magnetic powder is exposed. The cracks and the exposed metal magnetic powder may become transmission paths for a leakage current, and may cause an electrical short circuit between the component and an external electrode, thereby deteriorating the characteristic of the component. According to the present exemplary embodiment, all of the plurality of edges of the first surface 101 of the body 100 and the upper vertex regions U1, U2, U3, and U4 may be covered by the first, third, and fourth insulating layers 410, 430, and 440, thereby solving the above-described problem. In particular, each of the upper vertex regions U1, U2, U3, and U4 of the first surface 101 of the body 100 where it is more likely that the cracks exist and the exposed metal magnetic powder exists may be double covered by the first, third, and fourth insulating layers 410, 430, and 440, thereby improving the above-described effect.

A length of each of the third and fourth insulating layers 430 and 440 in the second direction W on the second surface 102, which is one surface of the body 100, is longest at opposite end portions of each of the third and fourth insulating layers 430 and 440 in the first direction L. Specifically, the length of the third insulating layer 430 in the width direction W on the second surface 102 of the body 100 is longest at the first and fourth lower vertex regions D1 and D4, which are the opposite end portions of the third insulating layer 430 in the length direction L. The length of the fourth insulating layer 440 in the width direction W on the second surface 102 of the body 100 is longest at the second and third lower vertex regions D2 and D3, which are the opposite end portions of the fourth insulating layer 440 in the length direction L. In general, an external stress is concentrated in an edge region of the component. Therefore, the crack may extend relatively long. By forming the third insulating layer 430 to be longer in the vertex regions D1 and D4 than in other regions and forming the fourth insulating layer 440 to be longer in the vertex regions D2 and D3 than in other regions, deterioration of the characteristic of the component due to the cracks may be more efficiently prevented.

As illustrated in FIG. 4, as the third and fourth insulating layers 430 and 440 are disposed on the third and fourth surfaces 103 and 104 of the body 100, respectively, the first and second auxiliary lead-out portions 312 and 322 respectively exposed to the third and fourth surfaces 103 and 104 of the body 100 may be in contact with the third and fourth insulating layers 430 and 440, respectively. That is, the first and second auxiliary lead-out portions 312 and 322 respectively exposed to the third and fourth surfaces 103 and 104 of the body 100 may be covered by the third and fourth insulating layers 430 and 440, respectively.

According to the above-described structure, the second, third, and fourth insulating layers 420, 430, and 440 may expose one region of the second surface 102 of the body 100. The external electrodes 500 and 600 to be described later are disposed in the exposed one region of the second surface 102 while being spaced apart from each other. For the above reasons, the external electrodes 500 and 600 may be spaced apart from the edges covered by the third and fourth insulating layers 430 and 440 among the plurality of edges of the second surface 102 of the body 100. In addition, for the above reasons, a distance between each of the external electrodes 500 and 600 and the edge covered by each of the third and fourth insulating layers 430 and 440 among the plurality of edges of the second surface 102 of the body 100 may be longest in the lower vertex regions D1, D2, D3, and D4 of the second surface 102 of the body 100. The external electrodes 500 and 600 may be spaced apart from the plurality of edges of the second surface 102 of the body 100, and the distance between each of the external electrodes 500 and 600 and each of the lower vertex regions D1, D2, D3, and D4 may be increased, thereby effectively preventing deterioration of the characteristic of the component.

Meanwhile, referring to FIG. 2, among the plurality of edges of the second surface 102 of the body 100, the first and second external electrodes 500 and 600 and the third and fourth insulating layers 430 and 440 may be disposed at the edges opposing each other in the first direction L, and the third and fourth insulating layers 430 and 440 may be disposed at the edges opposing each other in the second direction W. As a result, not a plurality of insulating layers are disposed at the edge of the second surface 102, but only one of the third and fourth insulating layers 430 and 440 is disposed at the edge of the second surface 102, such that a volume of the insulating layer on the second surface 102 may be relatively reduced to secure a volume of the body 100, and accordingly, a volume of the magnetic material may be increased to improve an inductance.

The first to fourth insulating layers 410, 420, 430, and 440 may each be formed of an insulating material including a thermosetting resin such as an epoxy resin, a thermoplastic resin such as a polyimide resin, or a photosensitive insulating resin or be formed of an insulating material having a reinforcement material such as a glass fiber or an inorganic filler impregnated in such an insulating resin. For example, the first to fourth insulating layers 410, 420, 430, and 440 may be formed of an insulating material such as prepreg, an Ajinomoto Build-up Film (ABF), FR-4, a Bismaleimide Triazine (BT) resin, a photoimagable dielectric (PID), or the like, but is not limited thereto. The materials used for the first to fourth insulating layers 410, 420, 430, and 440 may be the same or different to each other.

Referring to FIG. 3, the external electrodes 500 and 600 may be disposed on the second surface 102 of the body 100 while being spaced apart from each other, and may be connected to the coil portion 300. The external electrodes 500 and 600 may include connection portions that are disposed on the opposite side surfaces 105 and 106 of the body 100 opposing each other in the first direction L and are in contact with opposite end portions of the coil portion 300, and pad portions that extend from the connection portions to the second surface 102 of the body 100. Meanwhile, the disposition of the external electrodes 500 and 600 is not limited thereto, and the external electrodes 500 and 600 may be disposed on the opposite end surfaces 103 and 104 of the body 100 opposing each other in the second direction W, respectively. In this case, the third and fourth insulating layers 430 and 440 may be disposed on the opposite side surfaces 105 and 106 of the body 100 opposing each other in the first direction L.

Specifically, the first electrode layer 510 of the first external electrode 500 may be disposed on the fifth surface 105 of the body 100, be in contact with the outermost end portion of the second coil pattern 320 exposed to the fifth surface 105 of the body 100, and extend to the second surface 102 of the body 100. Specifically, the first electrode layer 510 of the first external electrode 500 may be in contact with the first main lead-out portion 311 exposed to the fifth surface 105 of the body 100. A region of the first electrode layer 510 of the first external electrode 500 that is disposed on the fifth surface 105 of the body 100 may correspond to the connection portion of the first external electrode 500, and a region of the first electrode layer 510 of the first external electrode 500 that is disposed on the second surface 102 of the body 100 may correspond to the pad portion of the first external electrode 500.

The first electrode layer 610 of the second external electrode 600 may be disposed on the sixth surface 106 of the body 100, be in contact with the outermost end portion of the first coil pattern 310 exposed to the sixth surface 106 of the body 100, and extend to the second surface 102 of the body 100. Specifically, the first electrode layer 610 of the second external electrode 600 may be in contact with the second main lead-out portion 321 exposed to the sixth surface 106 of the body 100. A region of the first electrode layer 610 of the second external electrode 600 that is disposed on the sixth surface 106 of the body 100 may correspond to the connection portion of the second external electrode 600, and a region of the first electrode layer 610 of the second external electrode 600 that is disposed on the second surface 102 of the body 100 may correspond to the pad portion of the second external electrode 600.

The first and second external electrodes 500 and 600 may be spaced apart from each other on the second surface 102 of the body 100 by the above-described second insulating layer 420. Meanwhile, second electrode layers 520 and 620 may be further disposed on the first electrode layers 510 and 610, respectively.

Referring to FIG. 1, the first and second external electrodes 500 and 600 may be disposed in regions of the fifth and sixth surfaces 105 and 106 of the body 100 other than regions of the fifth and sixth surfaces 105 and 106 to which the first, third, and fourth insulating layers 410, 430, and 440 extend. That is, the first, third, and fourth insulating layers 410, 430, and 440 extending to the fifth and sixth surfaces 105 and 106 may function as plating stop regions when forming the first and second external electrodes 500 and 600 by plating. Accordingly, the first and second external electrodes 500 and 600 on the fifth and sixth surfaces 105 and 106 may be spaced apart from the edges between each of the fifth and sixth surfaces 105 and 106 and each of the first, third, and fourth surfaces 101, 103, and 104 by a predetermined distance. Specifically, the first external electrode 500 may be formed by plating in a region of the fifth surface 105 that is spaced apart from the edge between the fifth surface 105 and each of the first, third, and fourth surfaces 101, 103, and 104 by a predetermined distance. The second external electrode 600 may be formed by plating in a region of the sixth surface 106 that is spaced apart from the edge between the sixth surface 106 and each of the first, third, and fourth surfaces 101, 103, and 104 by a predetermined distance.

Meanwhile, referring to FIGS. 1 through 3, the first electrode layers 510 and 610 may be formed after the first and second insulating layers 410 and 420 are formed on the first and second surfaces 101 and 102 of the body 100, respectively, and the third and fourth insulating layers 430 and 440 are formed on the third and fourth surfaces 103 and 104 of the body 100, respectively. Here, the third insulating layer 430 may not only be formed on the third surface 103 of the body 100, but also extend to at least a portion of each of the first, second, fifth, and sixth surfaces 101, 102, 105, and 106 connected to the third surface 103. The fourth insulating layer 440 may not only be formed on the fourth surface 104 of the body 100, but also extend to at least a portion of each of the first, second, fifth, and sixth surfaces 101, 104, 105, and 106 connected to the fourth surface 104. Accordingly, the connection portions of the external electrodes 500 and 600 may be formed on the fifth and sixth surfaces 105 and 106 of the body 100, respectively, but do not have to extend to the edge between the fifth surface 105 and each of the first, third, and fourth surfaces 101, 103, and 104, and the edge between the sixth surface 106 and each of the first, third, and fourth surfaces 101, 103, and 104, respectively. Since the connection portions of the external electrodes 500 and 600 do not extend to the edge between the fifth surface 105 and each of the first, third, and fourth surfaces 101, 103, and 104, and the edge between the sixth surface 106 and each of the first, third, and fourth surfaces 101, 103, and 104, respectively, an electrical short circuit due to a leakage current may be prevented, and deterioration of the characteristic of the component may be prevented.

The external electrodes 500 and 600 may be formed by a vapor deposition method such as sputtering, and/or a plating method, but the method for forming the external electrodes 500 and 600 is not limited thereto. The external electrodes 500 and 600 may also be formed by applying a conductive resin containing conductive powder such as copper (Cu) on the surfaces of the body 100 and curing the conductive resin.

The external electrodes 500 and 600 may be formed of a conductive material such as copper (Cu), aluminum (Al), silver (Ag), tin (Sn), gold (Au), nickel (Ni), lead (Pb), chromium (Cr), titanium (Ti), or alloys thereof, but are not limited thereto. The external electrodes 500 and 600 may each have a single-layer structure or have a multilayer structure. For example, the external electrode 500 or 600 may include the first electrode layer 510 or 610 containing copper (Cu) and the second electrode layer 520 or 620 containing at least one of nickel (Ni) or tin (Sn), but the external electrodes 500 and 600 are not limited thereto.

The insulating film IF may be disposed between the coil portion 300 and the body 100, and between the substrate 200 and the body 100. The insulating film IF may be formed along the surfaces of the substrate 200 and the coil portion 300, but is not limited thereto. The insulating film IF may be provided in order to insulate the coil portion 300 and the body 100 from each other, and may contain any known insulating material such as parylene, but is not limited thereto. As another example, the insulating film IF may contain an insulating material such as an epoxy resin, other than parylene. The insulating film IF may be formed by a vapor deposition method, but is not limited thereto. As another example, the insulating film IF may be formed by stacking an insulation film for forming the insulating film IF on opposite surfaces of the substrate 200 on which the coil portion 300 is formed and then curing the insulating film. Alternatively, the insulating film IF may be formed by applying an insulating paste for forming the insulating film IF on opposite surfaces of the substrate 200 on which the coil portion 300 is formed and then curing the insulating paste.

Meanwhile, in the above description, an exemplary embodiment in the present disclosure has been described with a case of the substrate 200 and the coil portion 300 formed on the substrate 200 by plating. However, the scope of the present disclosure is not limited thereto. That is, in another exemplary embodiment in the present disclosure, a winding coil formed by winding a metal wire having a surface subjected to insulating coating may be used as the coil portion. In this case, the above-described substrate 200 and the insulating film IF may be omitted in the exemplary embodiment.

Figure 6:
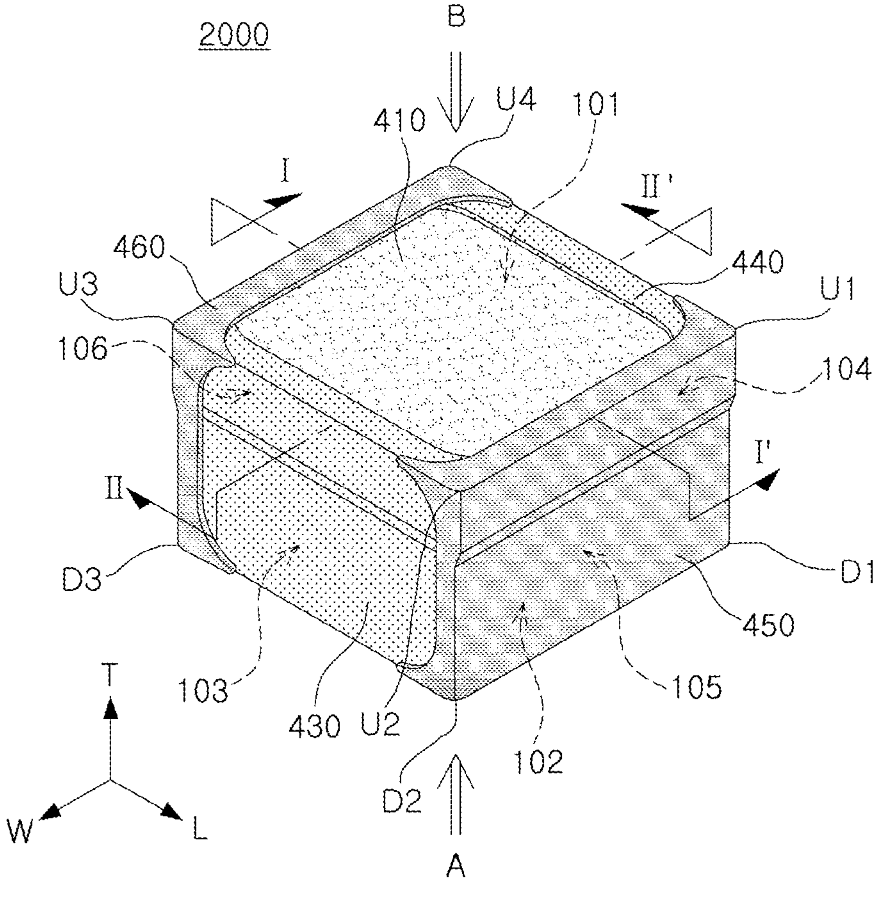
FIG. 6 is a perspective view schematically illustrating a coil component according to another exemplary embodiment.

FIG. 6 is a perspective view schematically illustrating a coil component according to another exemplary embodiment.

Figure 7:
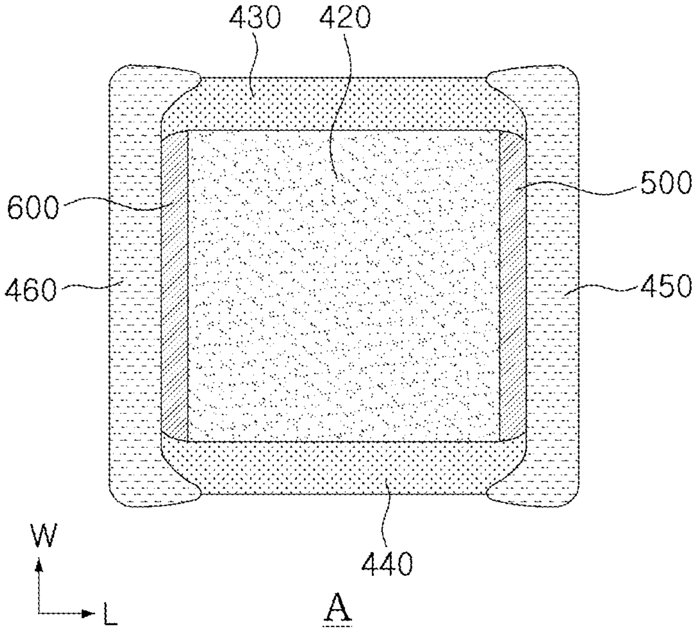
FIG. 7 is a bottom view illustrating the coil component of FIG. 6 according to another exemplary embodiment as viewed from below (a direction A in FIG. 6)

FIG. 7 is a bottom view illustrating the coil component of FIG. 6 according to another exemplary embodiment as viewed from below (a direction A in FIG. 6).

Figure 8:
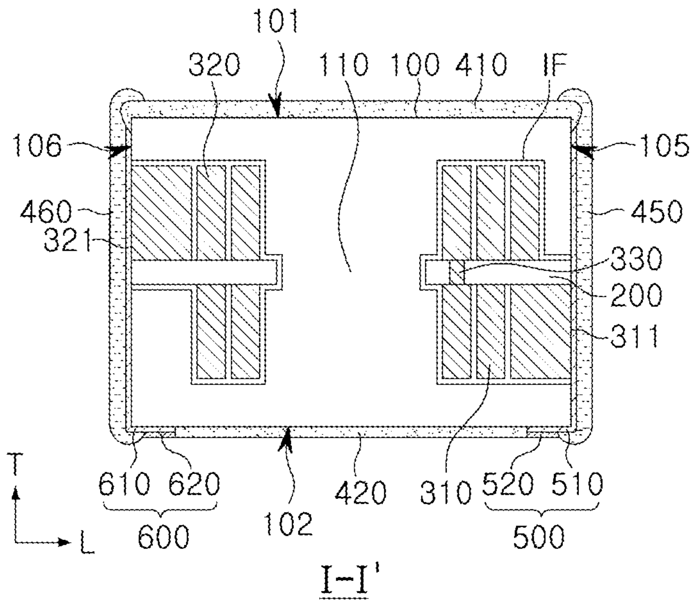
FIG. 8 is a cross-sectional view taken along line I-I' of FIG. 6.

FIG. 8 is a cross-sectional view taken along line I-I' of FIG. 6.

Figure 9:
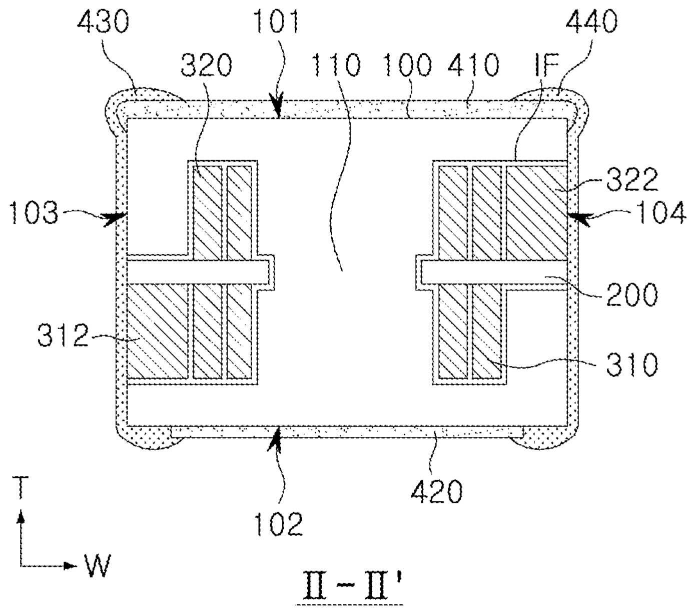
FIG. 9 is a cross-sectional view taken along line II-II' of FIG. 6.

FIG. 9 is a cross-sectional view taken along line II-II' of FIG. 6.

Referring to FIGS. 6 through 9, a coil component 2000 according to the present exemplary embodiment may further include fifth and sixth insulating layers 450 and 460 unlike the coil component 1000 according to the first exemplary embodiment in the present disclosure. Therefore, in describing the present exemplary embodiment, only the fifth and sixth insulating layers 450 and 460 and a disposition structure of external electrodes 500 and 600 will be described. For the rest of the configuration of the present exemplary embodiment, the description in the first exemplary embodiment in the present disclosure may be applied as it is.

Referring to FIG. 6, the fifth and sixth insulating layers 450 and 460 may be disposed on fifth and sixth surfaces 105 and 106 of a body 100, respectively.

Specifically, the fifth and sixth insulating layers 450 and 460 may each be connected to a second surface 102 corresponding to one surface of the body 100, may be disposed on opposite side surfaces 105 and 106 of the body 100 opposing each other in the first direction L, respectively, and may each extend to at least a portion of each of a first surface 101, the second surface 102, a third surface 103, and a fourth surface 104 connecting the opposite side surfaces 105 and 106 of the body 100. Here, the fifth and sixth insulating layers 450 and 460 extending to the first surface 101 of the body 100 may each cover at least portions of first, third, and fourth insulating layers 410, 430, and 440 to form an overlapping region. Further, the fifth and sixth insulating layers 450 and 460 extending to the second surface 102 of the body 100 may cover at least a portion of each of the third and fourth insulating layers 430 and 440 disposed on the second surface 102 to form an overlapping region.

FIG. 7 is a bottom view illustrating the coil component 2000 of FIG. 6 according to a second exemplary embodiment as viewed from below (a direction A in FIG. 6).

Referring to FIGS. 7 and 8, first, a second insulating layer 420 may be disposed on the second surface 102 of the body 100, the third and fourth insulating layers 430 and 440 may extend to the second surface 102, and then first electrode layers 510 and 610 of the first and second external electrodes 500 and 600 may be disposed on the fifth and sixth surfaces 105 and 106, respectively, and on the second surface 102. That is, pad portions of the first electrode layers 510 and 610 may be disposed on the second surface 102 of the body 100. Thereafter, the fifth and sixth insulating layers 450 and 460 may extend from the fifth and sixth surfaces 105 and 106 to the second surface 102, respectively, and expose at least portions of the first electrode layers 510 and 610 on the second surface 102. Thereafter, second electrode layers 520 and 620 may be disposed on the exposed first electrode layers 510 and 610, respectively.

According to the second exemplary embodiment, the second electrode layers 520 and 620 may be disposed only on the second surface 102 of the body 100. When the fifth and sixth insulating layers 450 and 460 are formed on the surfaces of the body 100, all the surfaces of the body 100 may be covered by the first to sixth insulating layers 410, 420, 430, 440, 450, and 460, and the first electrode layers 510 and 610. In addition, the first electrode layers 510 and 610 may be exposed while being spaced apart from each other only on the second surface 102 of the body 100 by the first to sixth insulating layers 410, 420, 430, 440, 450, and 460. Since the second electrode layers 520 and 620 are formed in this state, the second electrode layers 520 and 620 may be disposed only on the second surface 102 of the body 100. That is, the first and second external electrodes 500 and 600 exposed to the second surface 102 of the body 100 may be spaced apart from each of a plurality of edges of the second surface 102 of the body 100 by a predetermined distance. As the first and second external electrodes 500 and 600 are spaced apart from the edges of the body 100, a short circuit between the component and an adjacent external component may be prevented.

In this way, the fifth and sixth insulating layers 450 and 460 may expose at least portions of the pad portions of the first and second external electrodes 500 and 600 on the second surface 102 of the body 100 while covering connection portions of the first and second external electrodes 500 and 600 on the fifth and sixth surfaces 105 and 106 of the body 100. Accordingly, the first and second external electrodes 500 and 600 may be exposed to the second surface 102 of the body 100 to function as external electrodes.

In the coil component 2000 according to the second exemplary embodiment, the fifth and sixth insulating layers 450 and 460 may cover the connection portions of the first and second external electrodes 500 and 600 on the fifth and sixth surfaces 105 and 106, respectively, thereby protecting the first and second external electrodes 500 and 600 on the fifth and sixth surfaces 105 and 106, and prevent a short circuit between an adjacent component or conductor and the first and second external electrodes 500 and 600 from occurring.

A material of the fifth and sixth insulating layers 450 and 460 may include at least one of insulating materials used for the first to fourth insulating layers 410, 420, 430, and 440, but the material of the fifth and sixth insulating layers 450 and 460 does not have to be the same as that of the first to fourth insulating layers 410, 420, 430, and 440.

In the coil component 2000 according to the second exemplary embodiment, similarly to the third and fourth insulating layers 430 and 440, the fifth and sixth insulating layers 450 and 460 may cover upper vertex regions U1, U2, U3, and U4 and lower vertex regions D1, D2, D3, and D4.

Specifically, three insulating layers among the first insulating layer 410 and the third to sixth insulating layers 430, 440, 450, and 460 may be disposed in each of the upper vertex regions U1, U2, U3, and U4, such that a more reliable insulating property may be ensured.

Further, unlike the first exemplary embodiment in which one insulating layer of the third and fourth insulating layers 430 and 440 is disposed, two insulating layers among the third to sixth insulating layers 430, 440, 450, and 460 may be disposed in the lower vertex regions D1, D2, D3, and D4, such that a more reliable insulating property may be ensured. In particular, an unintentional short circuit between an adjacent component or conductor and the first and second external electrodes 500 and 600 may be prevented by a double insulating structure of the lower vertex regions D1, D2, D3, and D4.

As described above, there is a high probability that cracks exist in the edges and vertices, which are boundaries between the surfaces of the body, and there is a high probability that the conductive metal magnetic powder is exposed. The cracks and the exposed metal magnetic powder may become transmission paths for a leakage current, and may cause an electrical short circuit between the component and an external electrode, thereby deteriorating the characteristic of the component. However, in the coil component 2000 according to the second exemplary embodiment, the fifth and sixth insulating layers 450 and 460 may cover the edges that are boundaries between the surfaces of the body and are not covered by the first, third, and fourth insulating layers 410, 430, and 440, and may also cover the vertex regions of the body covered by the first, third, and fourth insulating layers 410, 430, and 440, thereby solving the above-described problem.

Since other contents are substantially the same as those described above, overlapping descriptions will be omitted.

Figure 10:
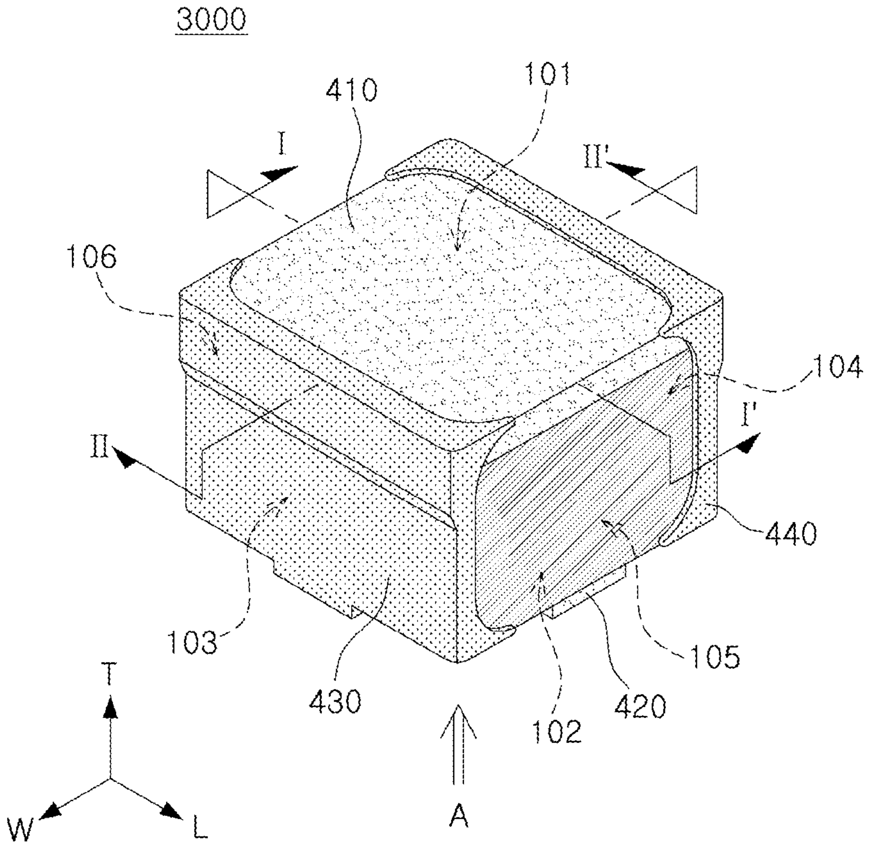
FIG. 10 is a perspective view schematically illustrating a coil component according to another exemplary embodiment.

FIG. 10 is a perspective view schematically illustrating a coil component according to another exemplary embodiment.

Figure 11:
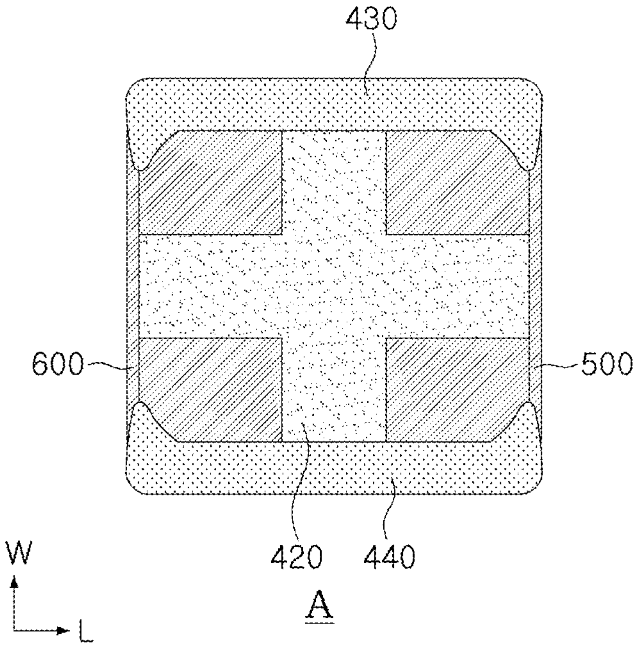
FIG. 11 is a bottom view illustrating the coil component of FIG. 10 according to another exemplary embodiment as viewed from below (a direction A in FIG. 10)

FIG. 11 is a bottom view illustrating the coil component of FIG. 10 according to another exemplary embodiment as viewed from below (direction A in FIG. 10).

Figure 12:
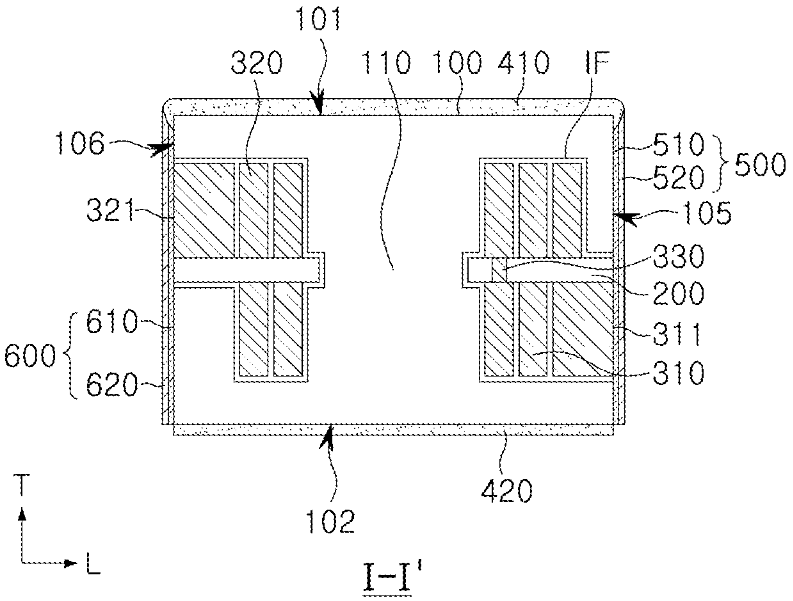
FIG. 12 is a cross-sectional view taken along line I-I' of FIG. 10.

FIG. 12 is a cross-sectional view taken along line I-I' of FIG. 10.

Figure 13:
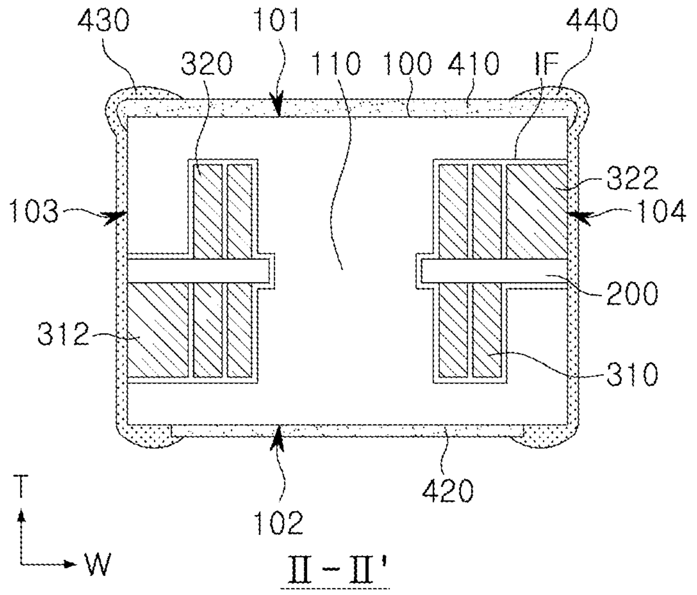
FIG. 13 is a cross-sectional view taken along line II-II' of FIG. 10.

FIG. 13 is a cross-sectional view taken along line II-II' of FIG. 10.

Referring to FIGS. 1 through 10, a coil component 3000 according to the present exemplary embodiment is different from the coil component 1000 according to the first exemplary embodiment in the present disclosure in regard to a shape of a second insulating layer 420. Therefore, in describing the present exemplary embodiment, only the shape of the second insulating layer 420 and a disposition structure of external electrodes 500 and 600 will be described. For the rest of the configuration of the present exemplary embodiment, the description in the first exemplary embodiment in the present disclosure may be applied as it is.

In the coil component 3000 according to a third exemplary embodiment, referring to FIGS. 10 and 11, the second insulating layer 420 disposed on a second surface 102 of a body 100 may have a cross shape and extend from a central portion of the second surface 102 to each of a plurality of edges of the second surface 102. The second insulating layer 420 disposed on the second surface 102 may be disposed on the second surface 102 without extending to a plurality of other walls. The second surface 102 of the body 100 may be separated into four regions by the second insulating layer 420, and the first and second external electrodes 500 and 600 may be disposed in the four separated regions by plating later.

In the coil component 3000 according to the third exemplary embodiment, similarly, first, the second insulating layer 420 may be disposed on the second surface 102 of the body 100, third and fourth insulating layers 430 and 440 may extend to the second surface 102, and then the first and second external electrodes 500 and 600 may be disposed on fifth and sixth surfaces 105 and 106, respectively, and on the second surface 102.

The first and second external electrodes 500 and 600 disposed on the second surface 102 may be disposed in a region of the second surface 102 other than a region where the second insulating layer 420 is disposed. As the second insulating layer 420 has the shape described above and illustrated in FIG. 11, the first and second external electrodes 500 and 600 may be spaced apart from each other. In addition, the first external electrode 500 may be separated by the second insulating layer 420, and the second external electrode 600 may also be separated by the second insulating layer 420.

However, each of the first and second external electrodes 500 and 600 may be separated by the second insulating layer 420 only on the second surface 102, and is not separated on the fifth and sixth surfaces 105 and 106 of the body 100. Specifically, a pad portion of the first external electrode 500 that is disposed on the second surface 102 of the body 100 may be separated into two regions by the second insulating layer 420, but the two regions may be connected by a connection portion of the first external electrode 500 that is disposed on the fifth surface 105 of the body 100. Further, a pad portion of the second external electrode 600 that is disposed on the second surface 102 of the body 100 may be separated into two regions by the second insulating layer 420, but the two regions may be connected by a connection portion of the second external electrode 600 that is disposed on the sixth surface 106.

Meanwhile, as described above, since the second insulating layer 420 may also be disposed on at least a portion of each of the plurality of edges of the second surface 102 of the body 100, region of the third and fourth insulating layers 430 and 440 that cover the edges of the second surface 102 of the body 100 may additionally cover the second insulating layer 420. Accordingly, a region where each of the third and fourth insulating layers 430 and 440 and the second insulating layer 420 overlap each other may be formed, and the third and fourth insulating layers 430 and 440 may each have a bend in the region where each of the third and fourth insulating layers 430 and 440 and the second insulating layer 420 overlap each other. For example, as illustrated in FIG. 10, a bend caused by the second insulating layer 420 may be formed in a region where the third insulating layer 430 covers the edge between the second surface 102 and the third surface 103 of the body 100.

Accordingly, among the plurality of edges of the second surface 102 of the body 100, at least a portion of each of the edges opposing each other in the second direction W may be covered by the second insulating layer 420 and the third or fourth insulating layer 430 or 440.

Even in a structure of the coil component 3000 according to the third exemplary embodiment, the second insulating layer 420 may have a symmetrical structure, and specifically, the second insulating layer 420 may have a point-symmetrical shape when viewed in the third direction T on the second surface 102 of the body 100. However, the scope of the present disclosure is not limited to the above-described shape of the second insulating layer 420. That is, the scope of the present disclosure may include a case in which it is difficult to specify the length direction and the width direction of the second insulating layer 420 only with the appearance of the second insulating layer 420 because the length and the width of the second insulating layer 420 have almost the same values, even in a case in which the shape of the second insulating layer 420 is different from that described above.

In the coil component 3000 according to the third exemplary embodiment, as a result, each of second electrode layers 520 and 620 of the first and second external electrodes 500 and 600 may be separated into two regions, and a structure in which the lower surface electrodes are exposed in a total of four regions is disclosed. Accordingly, volumes of the first and second external electrodes 500 and 600 on the second surface 102 of the body 100 may be reduced, and the second insulating layer 420 may be formed so as to be relatively thin by ink jet printing or screen-printing. Therefore, the volume of the body 100 and the volume of the magnetic material may be increased. Accordingly, an inductance and magnetic flux of the component may be increased.

Since other contents are substantially the same as those described above, an overlapping description will be omitted.

Figure 14:
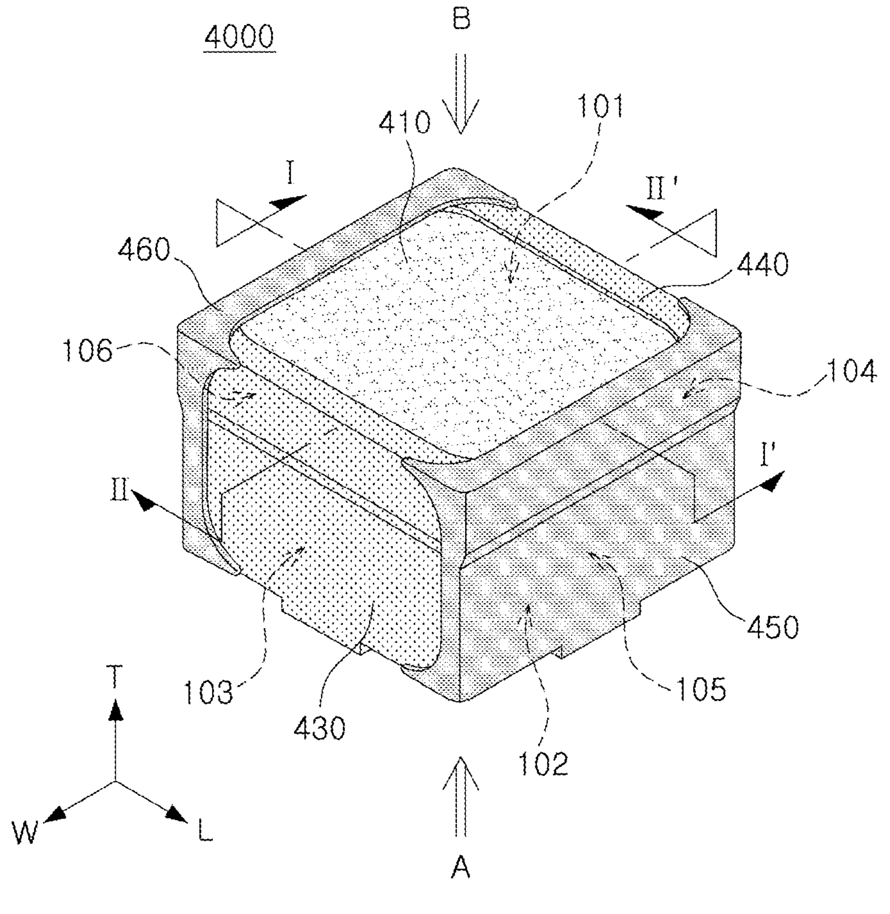
FIG. 14 is a perspective view schematically illustrating a coil component according to another exemplary embodiment.

FIG. 14 is a perspective view schematically illustrating a coil component according to another exemplary embodiment.

Figure 15:
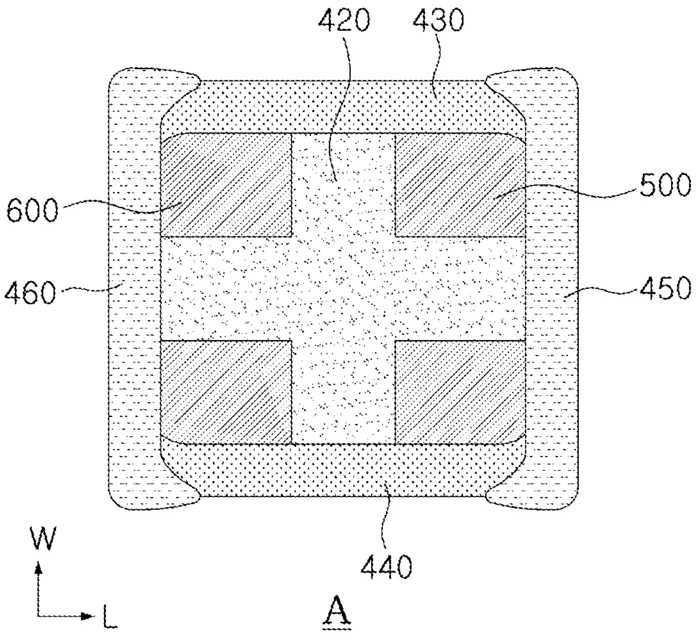
FIG. 15 is a bottom view illustrating the coil component of FIG. 14 according to another exemplary embodiment as viewed from below (a direction A in FIG. 14)

FIG. 15 is a bottom view illustrating the coil component of FIG. 14 according to another exemplary embodiment as viewed from below (a direction A in FIG. 14).

Figure 16:
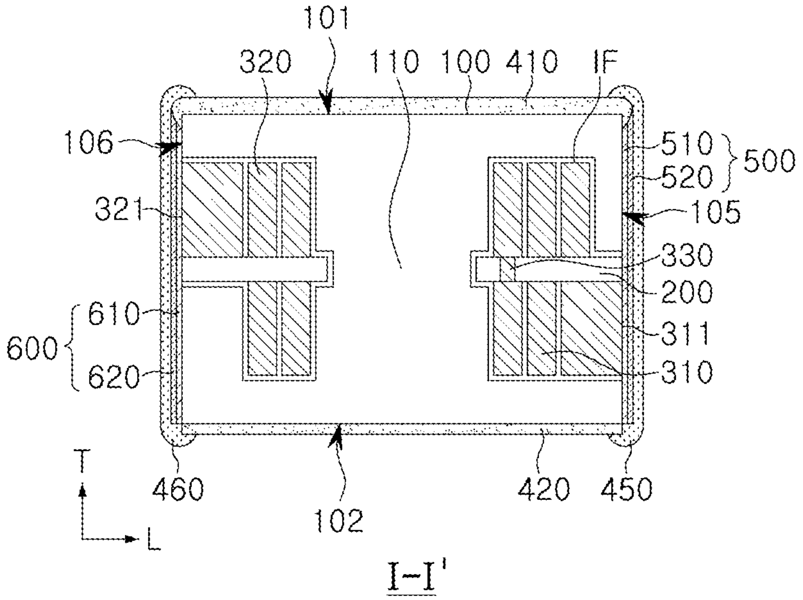
FIG. 16 is a cross-sectional view taken along line I-I' of FIG. 14.

FIG. 16 is a cross-sectional view taken along line I-I' of FIG. 14.

Figure 17:
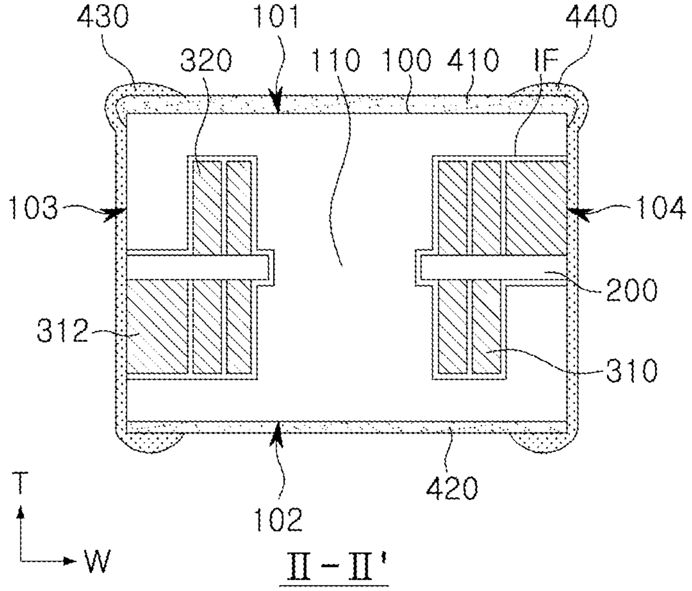
FIG. 17 is a cross-sectional view taken along line II-II' of FIG. 14.

FIG. 17 is a cross-sectional view taken along line II-II' of FIG. 14.

Referring to FIGS. 1 through 14, a coil component 4000 according to the present exemplary embodiment may further include fifth and sixth insulating layers 450 and 460 unlike the coil component 3000 according to the third exemplary embodiment in the present disclosure. Therefore, in describing the present exemplary embodiment, only the fifth and sixth insulating layers 450 and 460 and a disposition structure of external electrodes 500 and 600 will be described. For the rest of the configuration of the present exemplary embodiment, the description in the third exemplary embodiment in the present disclosure may be applied as it is.

Referring to FIG. 14, in the coil component 4000 according to a fourth exemplary embodiment, the fifth and sixth insulating layers 450 and 460 may be disposed on fifth and sixth surfaces 105 and 106 of a body 100, respectively.

Specifically, the fifth and sixth insulating layers 450 and 460 may each be connected to a second surface 102 corresponding to one surface of the body 100, may be disposed on opposite side surfaces 105 and 106 of the body 100 opposing each other in the first direction L, respectively, and may each extend to at least a portion of each of a first surface 101, the second surface 102, a third surface 103, and a fourth surface 104 connecting the opposite side surfaces 105 and 106 of the body 100. Here, the fifth and sixth insulating layers 450 and 460 extending to the first surface 101 of the body 100 may each cover at least portions of first, third, and fourth insulating layers 410, 430, and 440 to form an overlapping region. Further, the fifth and sixth insulating layers 450 and 460 extending to the second surface 102 of the body 100 may cover at least a portion of each of the third and fourth insulating layers 430 and 440 disposed on the second surface 102 to form an overlapping region.

In addition, the fifth and sixth insulating layers 450 and 460 extending to the second surface 102 of the body 100 may cover at least a portion of the second insulating layer 420 that are adjacent to edges of the second surface 102 of the body 100 opposing each other in the first direction L. Accordingly, among a plurality of edges of the second surface 102 of the body 100, at least a portion of each of the edges opposing each other in the second direction W may be covered by the second insulating layer 420 and the third or fourth insulating layer 430 or 440, and at least a portion of each of the edges opposing each other in the first direction L may be covered by the second insulating layer 420 and the fifth or sixth insulating layer 450 or 460.

The fifth and sixth insulating layers 450 and 460 may each have a bend in a region where each of the fifth and sixth insulating layers 450 and 460 and the second insulating layer 420 overlap each other. For example, as illustrated in FIG. 14, a bend caused by the second insulating layer 420 may be formed in a region where the fifth insulating layer 450 covers the edge between the second surface 102 and the fifth surface 105 of the body 100.

Referring to FIGS. 15 and 16, first, the second insulating layer 420 may be disposed on the second surface 102 of the body 100, the third and fourth insulating layers 430 and 440 may extend to the second surface 102, and then first and second electrode layers 510 and 610 of the first and second external electrodes 500 and 600 may be disposed on the fifth and sixth surfaces 105 and 106, respectively, and on the second surface 102. That is, pad portions of the first electrode layers 510 and 610 may be disposed on the second surface 102 of the body 100. Thereafter, the fifth and sixth insulating layers 450 and 460 may extend from the fifth and sixth surfaces 105 and 106 to the second surface 102, respectively, and at least portions of the first electrode layers 510 and 610 may be exposed to the second surface 102. Thereafter, second electrode layers 520 and 620 may be disposed on the exposed first electrode layers 510 and 610, respectively.

According to the fourth exemplary embodiment, the second electrode layers 520 and 620 may be disposed only on the second surface 102 of the body 100. When the fifth and sixth insulating layers 450 and 460 are formed on the surfaces of the body 100, all the surfaces of the body 100 may be covered by the first to sixth insulating layers 410, 420, 430, 440, 450, and 460, and the first electrode layers 510 and 610. In addition, the first electrode layers 510 and 610 may be exposed while being spaced apart from each other only on the second surface 102 of the body 100 by the first to sixth insulating layers 410, 420, 430, 440, 450, and 460. Since the second electrode layers 520 and 620 are formed in this state, the second electrode layers 520 and 620 may be disposed only on the second surface 102 of the body 100. That is, the first and second external electrodes 500 and 600 exposed to the second surface 102 of the body 100 may be spaced apart from each of the plurality of edges of the second surface 102 of the body 100 by a predetermined distance. As the first and second external electrodes 500 and 600 are spaced apart from the edges of the body 100, a short circuit between the component and an adjacent external component may be prevented.

In this way, the fifth and sixth insulating layers 450 and 460 may expose at least portions of the pad portions of the first and second external electrodes 500 and 600 on the second surface 102 of the body 100 while covering connection portions of the first and second external electrodes 500 and 600 on the fifth and sixth surfaces 105 and 106 of the body 100. Accordingly, the first and second external electrodes 500 and 600 may be exposed to the second surface 102 of the body 100 to function as external electrodes.

In the coil component 4000 according to the fourth exemplary embodiment, as a result, each of the second electrode layers 520 and 620 of the first and second external electrodes 500 and 600 may be separated into two regions, and a structure in which the lower surface electrodes are exposed in a total of four regions is disclosed. Accordingly, volumes of the first and second external electrodes 500 and 600 on the second surface 102 of the body 100 may be reduced, and the second insulating layer 420 may be formed so as to be relatively thin by ink jet printing or screen-printing. Therefore, the volume of the body 100 and the volume of the magnetic material may be increased. Accordingly, inductance and magnetic flux of the component may be increased.

In addition, the description of the fifth and sixth insulating layers 450 and 460 in the coil component 2000 according to the second exemplary embodiment may be equally applied to a covering structure and multi-insulation structure for vertex regions by the disposition of the fifth and sixth insulating layers 450 and 460 and effects thereof.

Figure 18:
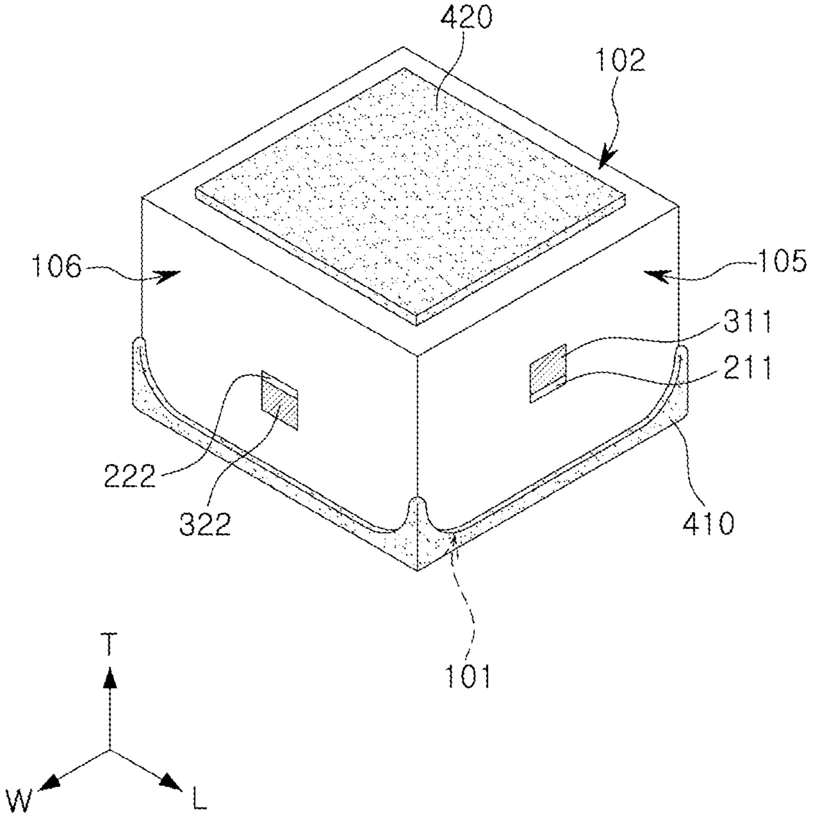
FIGS. 18 through 20 are process views sequentially illustrating a method for manufacturing the coil component according to an exemplary embodiment in the present disclosure.
Figure 19:
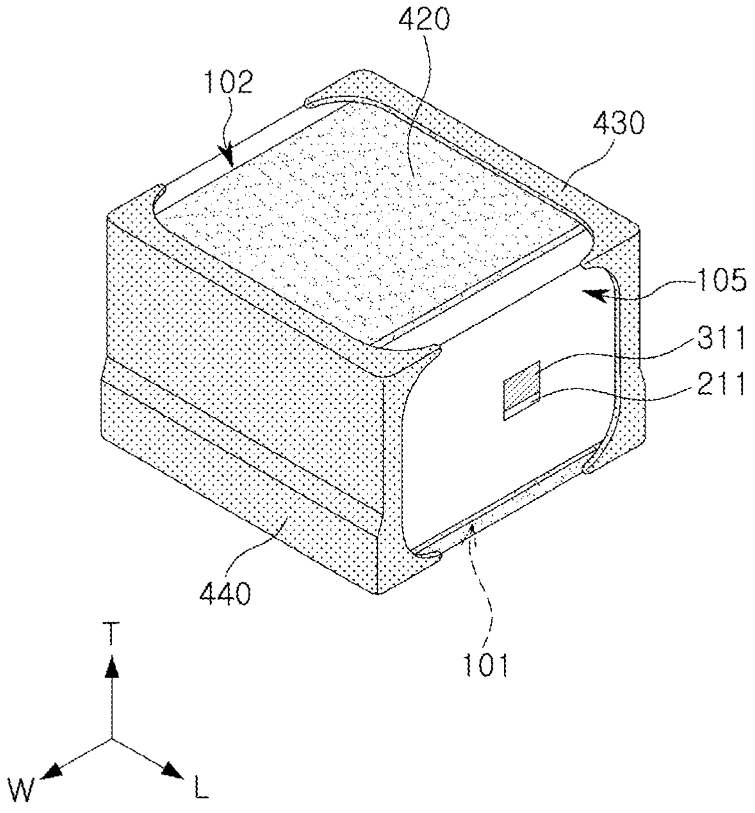
Figure 20:
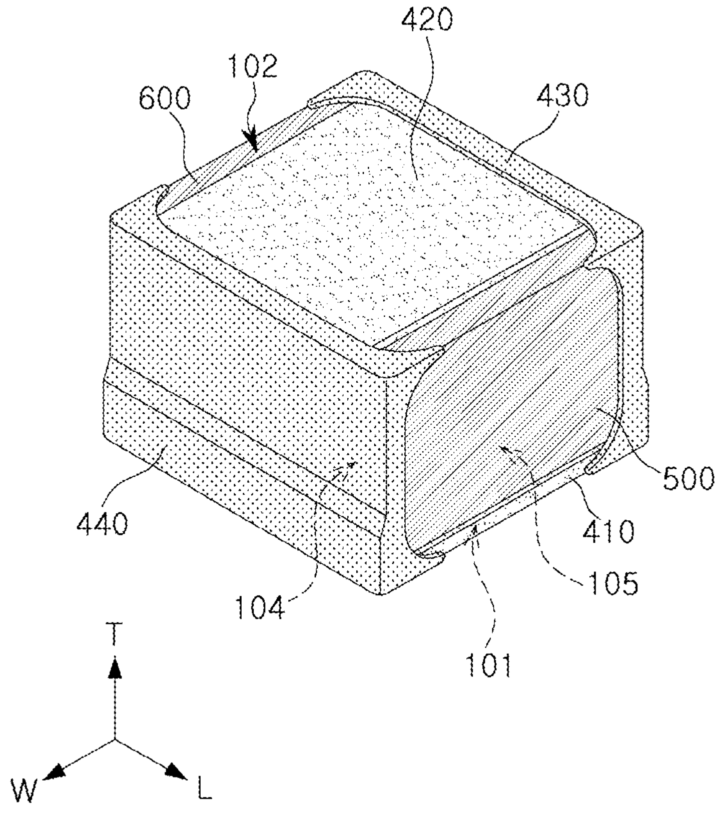

FIGS. 18 through 20 are process views sequentially illustrating a method for manufacturing the coil component according to an exemplary embodiment in the present disclosure.

Referring to FIGS. 18 through 20, the first electrode layers 510 and 610 may be formed after the first and second insulating layers 410 and 420 are formed on the first and second surfaces 101 and 102 of the body 100, respectively, and the third and fourth insulating layers 430 and 440 are formed on the third and fourth surfaces 103 and 104 of the body 100, respectively. Here, the third insulating layer 430 may not only be formed on the third surface 103 of the body 100, but may also extend to at least a portion of each of the first, second, fifth, and sixth surfaces 101, 102, 105, and 106 connected to the third surface 103. The fourth insulating layer 440 may not only be formed on the fourth surface 104 of the body 100, but may also extend to at least a portion of each of the first, second, fifth, and sixth surfaces 101, 104, 105, and 106 connected to the fourth surface 104. Accordingly, the connection portions of the external electrodes 500 and 600 may be formed on the fifth and sixth surfaces 105 and 106 of the body 100, respectively, but do not have to extend to the edge between the fifth surface 105 and each of the first, third and fourth surfaces 101, 103, and 104, and the edge between the sixth surface 106 and each of the first, third, and fourth surfaces 101, 103, and 104, respectively. Since the connection portions of the external electrodes 500 and 600 do not extend to the edge between the fifth surface 105 and each of the first, third and fourth surfaces 101, 103, and 104, and the edge between the sixth surface 106 and each of the first, third, and fourth surfaces 101, 103, and 104, respectively, an electrical short circuit due to a leakage current may be prevented, and deterioration of the characteristic of the component may be prevented.

Meanwhile, according to the present disclosure, the first to sixth insulating layers 410, 420, 430, 440, 450, and 460 may be formed by a pad printing method or a screen-printing method. Therefore, as compared to a case in which the insulating layer is formed using other methods such as a dipping method, the insulating layer may be formed thinner, and the volume of the magnetic material inside the body 100 may be increased accordingly, which may contribute to improvement of the magnetic flux and inductance.

In addition, the opposite side surfaces and the opposite end surfaces of the body may have a square shape or a shape similar to the square shape, and the coil portion 300 may be exposed to all the opposite side surfaces and opposite end surfaces of the body, such that the process of identifying the opposite side surfaces and the opposite end surfaces by using a machine may be omitted in the manufacturing process, and thus, process simplification and cost reduction may be achieved.

As set forth above, according to the exemplary embodiment in the present disclosure, the coil component capable of being lightweight, thin, and compact may be provided.

The coil component capable of improving productivity and significantly reducing man-hours by simplifying a manufacturing process may be provided.

The coil component in which the volume of the magnetic body is increased to increase an inductance may be provided.

The coil component capable of reducing the effective mounting area may be provided.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having a first surface and a second surface opposing each other and third to sixth surfaces connecting the first surface and the second surface to each other;

a coil portion disposed within the body;

first and second external electrodes disposed on the second surface of the body while being spaced apart from each other and connected to the coil portion;

a first insulating layer disposed on the first surface of the body and extending to at least a portion of each of the third to sixth surfaces of the body; and a second insulating layer disposed on the second surface of the body;

wherein the first and second insulating layers are separated from each other;

wherein the coil component further comprises third and fourth insulating layers disposed on the third and fourth surfaces of the body, respectively, and each extending to the second surface of the body, and each of the third and fourth insulating layers covers at least a portion of the second insulating layer on the second surface of the body; and wherein the third and fourth insulating layers each has a region whose width decreases as a distance from a center of the second surface of the body increases in a second direction perpendicular to the first direction.

2. The coil component of claim 1, wherein the second insulating layer extends to at least a portion of each of a plurality of edges of the first surface of the body on the first surface of the body.

3. The coil component of claim 1, wherein the third and fourth surfaces respectively connect to the second surface of the body and opposing each other in the second direction.

4. The coil component of claim 3, wherein each of the third and fourth insulating layers extends to the first surface of the body and covers at least a portion of the first insulating layer.

5. The coil component of claim 4, wherein the first and second external electrodes are separated from each other by the second insulating layer on the second surface of the body.

6. The coil component of claim 5, wherein a shortest distance between each of the plurality of edges of the second surface of the body and the first and second external electrodes is longest at a vertex region of the second surface of the body.

7. The coil component of claim 6, wherein the fifth and sixth surfaces respectively connect to the first surface of the body and opposing each other in a first direction, the coil component further comprises fifth and sixth insulating layers disposed on the fifth and sixth surfaces of the body, respectively, and each extending to the first surface of the body, and the fifth and sixth insulating layers cover at least portions of the first and second external electrodes, respectively, on the first surface of the body.

8. The coil component of claim 7, wherein each of the fifth and sixth insulating layers extends to the second surface of the body and covers at least a portion of each of the first insulating layer, the third insulating layer, and the fourth insulating layer on the second surface of the body.

9. The coil component of claim 8, wherein regions where the fifth and sixth insulating layers expose the first and second external electrodes, respectively, on the first surface of the body are spaced apart from each of the plurality of edges of the first surface of the body.

10. The coil component of claim 9, wherein the first insulating layer disposed on each of the third and fourth surfaces of the body opposing each other in the second direction has a region whose width increases as a distance from a center of each of the third and fourth surfaces of the body increases in the first direction, and the first insulating layer disposed on each of the fifth and sixth surfaces of the body opposing each other in the first direction has a region whose width increases as a distance from a center of each of the fifth and sixth surfaces of the body increases in the second direction.

11. The coil component of claim 10, wherein the first and second external electrodes are disposed on the fifth and sixth surfaces of the body and are in contact with opposite end portions of the coil portion, and the third and fourth insulating layers extend to the fifth and sixth surfaces of the body, respectively, so that the first and second external electrodes are spaced apart from edges between the third and fourth surfaces of the body and the fifth and sixth surfaces of the body.

12. The coil component of claim 1, further comprising a substrate disposed within the body, wherein the coil portion includes a first coil pattern disposed on second surface of the substrate, a second coil pattern disposed on the second surface of the substrate opposing the second surface of the substrate, and a via penetrating through the substrate and connecting the first and second coil patterns to each other.

13. The coil component of claim 12, wherein the first coil pattern has a first main lead-out portion exposed to the fifth surface and a first auxiliary lead-out portion exposed to the third surface, and the second coil pattern has a second main lead-out portion exposed to the sixth surface and a second auxiliary lead-out portion exposed to the fourth surface.

14. A coil component comprising:

a body having a first surface and a second surface opposing each other and third to sixth surfaces connecting the first surface and the second surface to each other;

a coil portion disposed within the body;

first and second external electrodes disposed on the second surface of the body while being spaced apart from each other and connected to the coil portion;

first and second insulating layers disposed on the first surface of the body and the second surface of the body, respectively; and third and fourth insulating layers respectively connected to the second surface of the body, disposed on the third and fourth surfaces of the body opposing each other in a second direction, respectively, and each extending to the second surface of the body, wherein the second insulating layer is spaced apart from each of a plurality of edges of the second surface of the body, and a length of each of the third and fourth insulating layers in the second direction on the second surface of the body, is longest at opposite end portions of each of the third and fourth insulating layers in a first direction perpendicular to the second direction.

15. The coil component of claim 14, further comprising fifth and sixth insulating layers respectively connected to the first surface of the body, disposed on the fifth and sixth surfaces of the body opposing each other in a first direction perpendicular to the second direction, respectively, each extending to the first surface of the body, and covering at least portions of the first and second external electrodes, respectively.

16. The coil component of claim 14, wherein each of the external electrodes includes first electrode layer and the second electrode layer.

17. The coil component of claim 16, wherein the first electrode layer contains copper (Cu), and the second electrode layer contains at least one of nickel (Ni) or tin (Sn).

* * * * *